United States Patent [19]

Early

[11] Patent Number: 5,551,397
[45] Date of Patent: Sep. 3, 1996

[54] DIGITALLY CONTROLLED MAGNETO IGNITION SYSTEM WITH ALTERNATE TIMING

[76] Inventor: Derrick A. Early, 8517 60th Ave., Berwyn Heights, Md. 20740

[21] Appl. No.: 402,696

[22] Filed: Mar. 13, 1995

[51] Int. Cl.$^6$ .................................................... F02P 1/08
[52] U.S. Cl. .......................................... 123/418; 123/599
[58] Field of Search .................................. 123/418, 595, 123/599

[56] References Cited

U.S. PATENT DOCUMENTS

| | | | |
|---|---|---|---|
| 3,747,582 | 7/1973 | Kato | 123/149 D |
| 3,938,491 | 2/1976 | Mazza | 123/149 C |
| 3,951,122 | 4/1976 | Haubner et al. | 123/599 |
| 4,175,509 | 11/1979 | Orova et al. | 123/418 |
| 4,188,929 | 2/1980 | Podrapsky | 123/148 E |
| 4,188,930 | 2/1980 | Santi | 123/148 E |
| 4,329,950 | 5/1982 | Orova | 123/149 C |
| 4,378,769 | 4/1983 | Haubner | 123/416 |
| 4,641,627 | 2/1987 | Nash | 123/595 |
| 4,924,831 | 5/1990 | Piteo et al. | 123/417 |
| 5,056,481 | 10/1991 | Podrapsky | 123/149 D |
| 5,105,794 | 4/1992 | Fukuda | 123/651 |
| 5,138,995 | 8/1992 | Erhard | 123/418 |
| 5,383,433 | 1/1995 | Fiorenza | 123/416 |

Primary Examiner—David A. Okonsky

[57] ABSTRACT

A digitally controlled magneto provides for the precise control of the timing advance profile for an internal combustion engine. A micro-controller or a micro-processor provides the digital control by using inputs from engine sensors to determine the engine's crank speed and position. With this information, it computes an optimum timing advance angle for the time of spark generation. The digital system controls the spark generation by using a semiconductor switching circuit to interrupt the flow of current generated by the magneto in the primary coil. The current flow interruption results in a high voltage pulse in the secondary coil creating a spark in a spark gap for the initiation of combustion in the internal combustion engine. To maintain the operational reliability of the magneto ignition system, an alternate timing system allows the internal combustion engine to produce full power even if the electrical power supplied to the digital system fails. The invention succeeds in improving the efficiency of the internal combustion engine while maintaining its operational reliability. An increase in efficiency has the advantage of both reducing the engine's toxic exhaust emissions and its specific fuel consumption rate.

19 Claims, 4 Drawing Sheets

DIGITALLY CONTROLLED MAGNETO IGNITION SYSTEM WITH ALTERNATE TIMING

RELATED APPLICATIONS

This invention relates to a high tension ignition system for an internal combustion engine, and more particularly to a magneto ignition system that uses a digitally controlled semiconductor switching circuit to interrupt current flow in the primary circuit to generate a pulse of high voltage for the generation of a spark in a spark gap.

Several magneto systems with semiconductor switches are disclosed in U.S. Pat. Nos. 3,938,491, Mazza, 4,188,929, Podrapsky et al., 4,188,930, Santi, 4,329,950, Orova et al., 5,056,481, Podrapsky et al., and 5,105,794, Fukuda. All of the patents cited use a semiconductor switching circuit to interrupt the current flow in the primary coil for the generation of a high voltage pulse that creates a spark. Depending on the engine speed two of the patents cited, 5,105,794, Fukuda, and 4,188,929, Podrapsky et al., vary the timing advance angle that the internal combustion engine's crank shaft rotates from the time the spark is generated to the time the piston reaches top dead center (TDC). The cited prior art controls the semiconductor switch with an electronic timing circuit that uses a wave of current from the magneto primary coil or from an auxiliary coil for the power to the timing circuit. All the patents mentioned above provide for a fixed timing advance angle versus engine rpm profile. They also provide for the generation of a spark on one polarity of the current wave generated by the magneto in the primary coil, and the other polarity is suppressed by some form of dissipation.

A magneto system with a semiconductor switch and a micro-controller ignition system is disclosed in U.S. Pat. No. 5,383,433, Fiorenza. In this patent, a magneto system is used to start the internal combustion engine. After the engine is running, the micro-controller begins using a battery or an alternator to power the primary coil for spark generation. At low engine speeds, the magneto allows the engine to start if the battery is too low for the generation of a spark. At higher speeds, the micro-controller allows the engine to operate efficiently and uses a battery or alternator to power the primary coil. While the micro-controller is in control, the spark generated by the magneto is either suppressed or wasted.

A magneto system with micro-controller activated semiconductor switch is disclosed in U.S. Pat. No. 4,378,769, Haubner et al. In this patent, a micro-controller is powered by the magneto and the timing reference signals used are also provided by the magneto. The micro-controller controls the semiconductor switch for the generation of a spark on one polarity of the current wave generated by the magneto in the primary coil, and the other polarity is suppressed by some form of dissipation as in the patents cited above.

Magneto ignition systems are used when a high operational reliability is desired. They are also used when an electrical power source is not available. In many cases, an electrical source is available but not completely reliable. This invention intends to satisfy the operational reliability requirement while taking advantage of the electrical power supplied in the later case.

SUMMARY OF THE INVENTION

The object of the invention is to provide digital control of a magneto ignition system for an internal combustion engine while still providing the operational reliability of a conventional breaker type magneto. The digital control is achieved with a micro-controller or a micro-processor herein called a micro-chip. The micro-chip receives the engine's crank speed and position information and computes an appropriate advance angle for the time of the spark generation. The control of the spark generation is achieved by using two Darlington transistor pairs in the primary circuit of the ignition system. The Darlington's are switched digitally by the micro-chip. In the case of electrical power failure to the digital control system, an alternate timing means provides for the control of the magneto ignition system.

Four electrical power failure modes have been considered and protected against. The first is loss of electrical power. The second is low voltage in the case of the system battery losing its stored energy. The third is high voltage in the case of the charging system's voltage regulation failing. The fourth is reverse polarity in the case of the system battery being installed incorrectly. In all four cases, the invention reverts to controlling the magneto ignition system with an alternate timing means. This allows for the continuous operation of the internal combustion engine regardless of the power supplied by the electrical system. Protection against the high and low voltage conditions also prevents errors being generated by the micro-chip resulting in possible premature detonation, also known as "knocking," in the internal combustion engine.

When the digital system is activated, it uses the input from a timing signal to determine what is the optimum timing advance angle to maximize the efficiency of the combustion cycle. The timing advance angle is determined by using a digitized result based on the timing signal as an index into a table of timing advance angles. Once the timing advance angle is determined, the time for the spark generation is computed based on the engine's rotation speed and the timing signal. At the appropriate time, the digital system will switch the two Darlington transistor pairs in the primary circuit off causing the secondary circuit to generate a spark in a spark gap. By precisely adjusting the timing advance angle, the invention improves the efficiency of the combustion cycle of the internal combustion engine.

The alternate timing means of the invention provides the advantage of increased operational reliability by allowing the internal combustion engine to continue to generate full power even if the electrical system, which provides power to the timing control, fails. The invention has the advantage of reducing errors generated by a digital system when the voltage supplied is too high or too low. The prevention of digital errors helps to prevent the engine from experiencing a loss of power or premature detonation.

The invention has a distinct advantage of switching both the positive and negative polarities of current generated by the magneto allowing the semiconductor switch to generate a spark on either polarity of current. By switching both polarities of current, existing internal combustion engines will have the proper number of sparks generated per rotation with the advantage of modern timing control.

The invention also has a distinct ability of being easily retrofited to existing magneto systems. Many existing magneto ignition systems are breaker point type magnetos. The invention is installed by placing the digitally controlled system into the primary circuit of the magneto. This feature allows breaker point type magnetos to be upgraded to a modern method of timing control while retaining the breaker point as an alternate timing means and maintaining its operational reliability. Using this modern method of timing control will result in increased efficiency of existing internal combustion engines. Increasing the existing engine's efficiency has the advantage of both reducing its toxic exhaust emissions and reducing its specific fuel consumption rate.

DRAWINGS ILLUSTRATING A PREFERRED EMBODIMENT

DESCRIPTION OF THE PREFERRED EMBODIMENT

Figure 1:
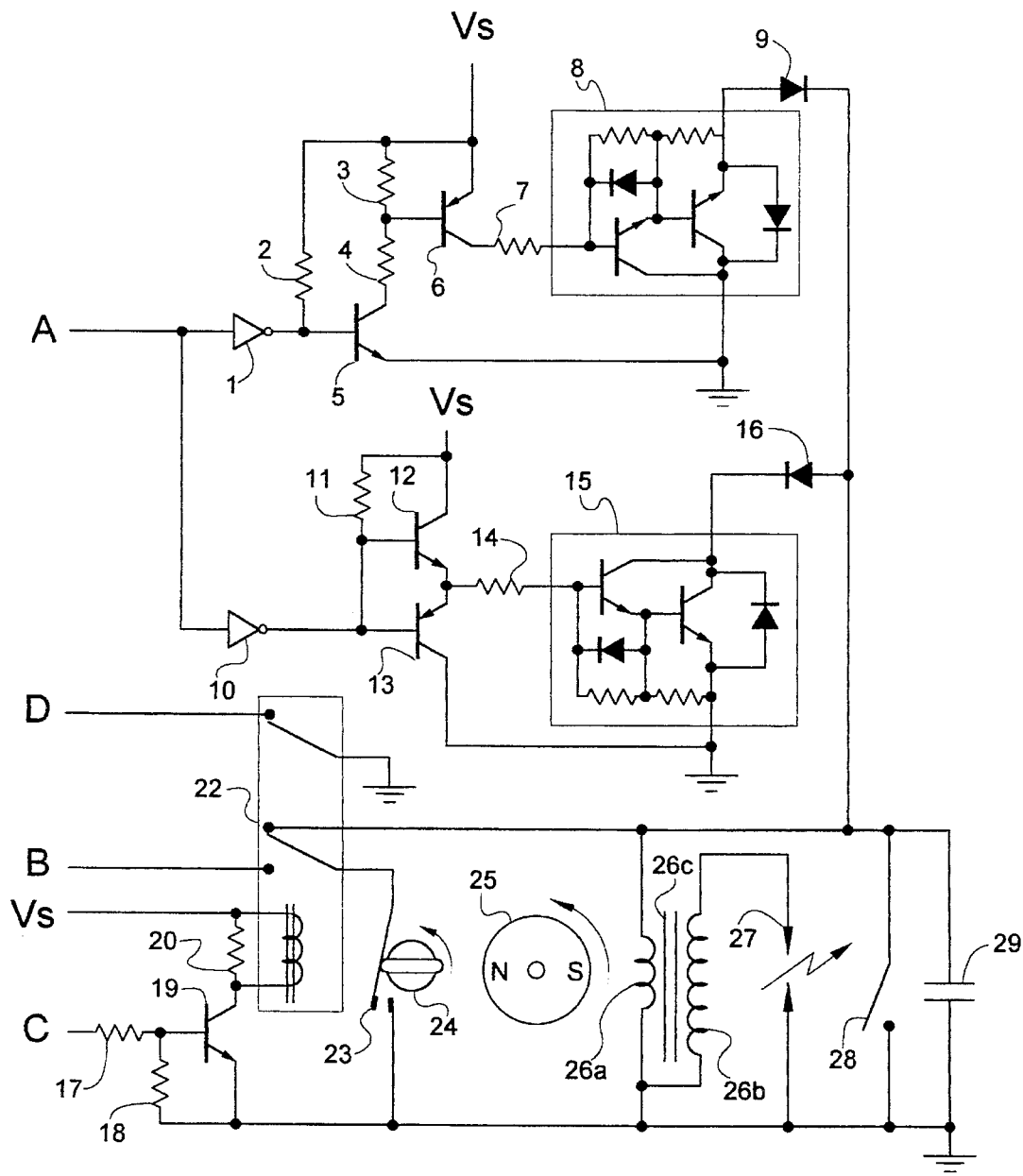
FIG. 1 illustrates the magneto and the semiconductor switch means.

The portion of the circuit illustrated in FIG. 1 depicts a rotor with a magnetic system, such as rotating magnet 25 with opposing north N and south S poles, and a rotating cam 24. Cam 24 and magnet 25 are driven on the same shaft, and the shaft is driven by an auxiliary gear of an internal combustion engine. The rotation of magnet 25 in the close proximity to a primary and a secondary induction coil, such as the primary coil 26a and secondary coil 26b, generates an alternating electromagnetic force. This alternating electromagnetic force generates an alternating current flow in the primary coil 26a when an alternate timing means, such as alternate switch 23, is closed and relay 22 is in its relaxed state. While the current is flowing, cam 24 opens alternate switch 23 interrupting the current flowing through the primary coil 26a. In order to balance the loss of current flowing in the primary coil 26a, the secondary coil 26b generates enough electromagnetic force to overcome the resistance in spark gap 27 creating a spark of current at the moment alternate switch 23 is opened.

The high voltage from the secondary coil 26b may be distributed to as many spark gaps as practical by means of a high voltage distributor consisting of a rotor and contacts for each spark gap. The magnetic coupling between primary coil 26a and secondary coil 26b is enhanced by the ferrous core 26c increasing the efficiency of the spark generation. To reduce the arcing in alternate switch 23, capacitor 29 is placed to reduce the rate of change of the voltage across the contacts. Reducing the arcing in alternate switch 23 increases its life and may enhance the energy of the spark in spark gap 27. In order to stop the generation of sparks in spark gap 27, ground switch 28 is closed. This allows the current to flow unarrested in the primary coil 26a.

At this point, a breaker type magneto has been described that generates a spark in spark gap 27 twice per rotation at a fixed angle of the cam 24 which is synchronized with the rotation of the internal combustion engine. The breaker type magneto holds a fixed timing advance angle with the exception of a mechanical retard to zero degrees for starting purposes. A graph representing the timing advance angle versus engine rotation speed is shown for the breaker type magneto by curve 64 on FIG. 3. In order to shift or advance the time of the spark to curve 73, the remaining portions of the circuit on FIG. 1 and FIG. 2 must be utilized.

Figure 2:
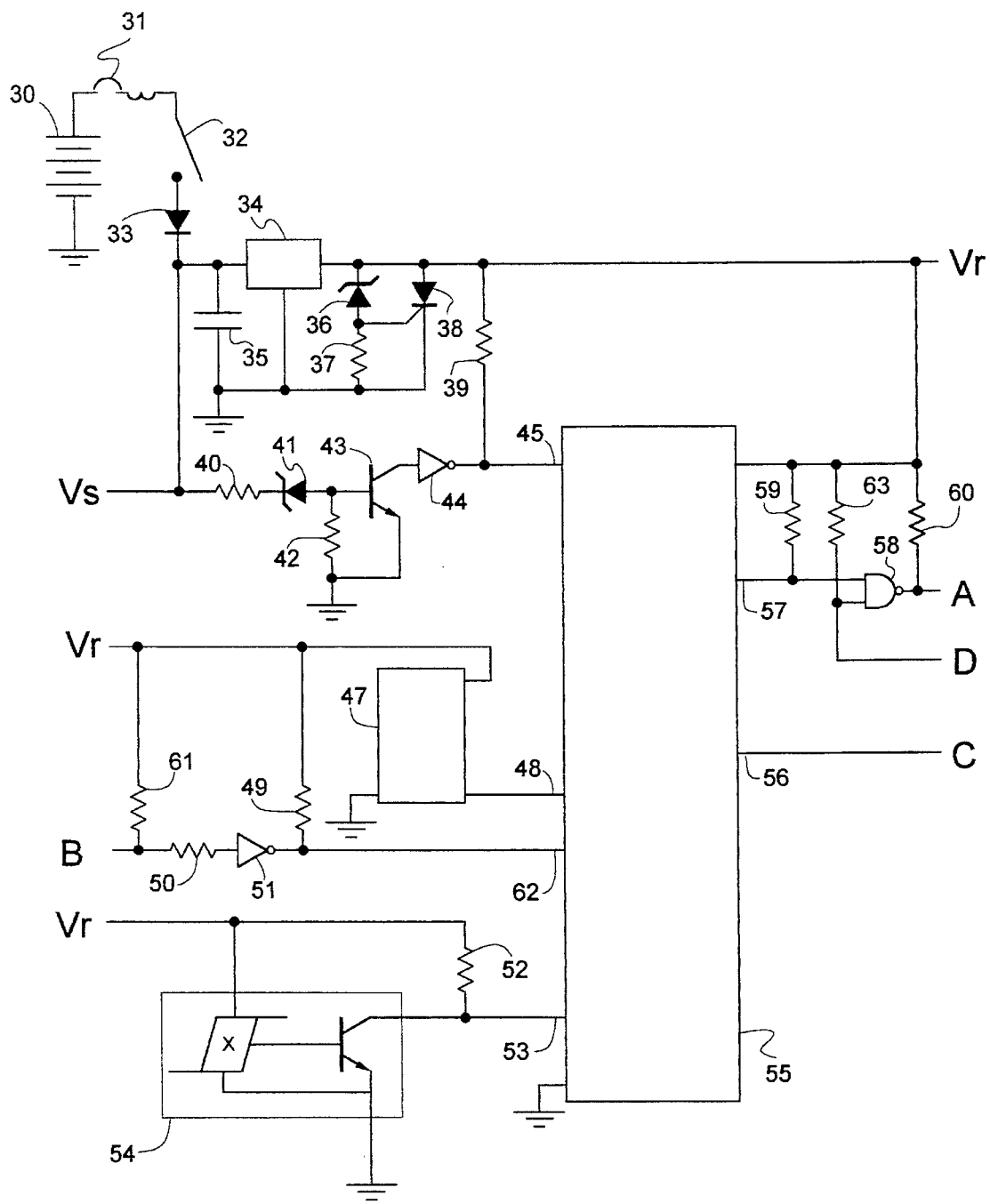
FIG. 2 illustrates the timing control means and the voltage protection circuits.

To initiate a shifted or advanced time of spark, switch 32 on FIG. 2 is closed. This provides a positive voltage from the battery 30 through current limit switch 31 and reverse polarity protection diode 33 to conductor Vs. The voltage on conductor Vs supplies an input to voltage regulator integrated circuit (IC) 34. Capacitor 35 connected between the input voltage and ground stabilizes the input voltage. The output from the voltage regulator IC 34 is a fixed voltage available on conductor Vr supplying power to a timing control means, such as micro-chip 55 and oscillator IC 47.

While micro-chip 55 is starting, the timing output pin 57 is held high by the pull-up resistor 59 and conductor D is held at ground. These two inputs into NAND 58 cause the output of NAND 58 to be high placing the voltage on conductor A at the same voltage as conductor Vr. Voltage Vr on conductor A holds a semiconductor switch means, such as including both Darlington transistors 8 and 15 on FIG. 1, in its non-conductive state. At this point, the flow of current in the primary coil 26a may still be interrupted by alternate switch 23. After the output from oscillator IC 47 stabilizes and the master clear pin 45 reaches voltage Vr, the micro-chip 55 starts running the algorithm on FIG. 5 at start 88. The first instruction in the initialization block 74 holds a switching time signal high, such as setting the timing output pin 57 on FIG. 2 high, and the next instruction generates an enable signal, such as setting enable pin 56 high. When enable pin 56 is high, conductor C provides current through current limiting resistor 17 on FIG. 1 to the base of NPN transistor 19 turning the transistor on. This energizes relay 22 by conducting current from conductor Vs through the relay coil to ground through NPN transistor 19. With the relay 22 energized, conductor D is no longer held at ground through the relay 22 contacts. Conductor D is pulled up to voltage Vr by resistor 63 on FIG. 2. With both conductor D and timing output pin 57 high, the NAND 58 holds conductor A at ground. This puts both Darlington transistors 8 and 15 on FIG. 1 in their conductive state allowing relay 22 to remove alternate switch 23 from the primary circuit without generating a spark. This prevents a spark in the same manner as ground switch 28 does if it is closed.

Once relay 22 is energized, the micro-chip 55 on FIG. 1 controls the time of the spark by driving its timing output pin 57 to ground to generate a spark and holding it high to allow current to flow through the primary coil 26a on FIG. 2. A trace of the switching time signal from the timing output pin 57 versus the rotation angle of the engine crank is shown as curve 65 on FIG. 4. The amount of time that the switch time signal must be low for complete spark generation is called the dwell time. This may be measured as a dwell angle and is shown as dwell angle 69. The timing control means uses a fixed dwell time of 4 ms; therefore, the dwell angle will vary with engine speed. The advance angle is measured by advance angle 68 with 180 and 360 degrees being top dead center for the engine. The other signal traces will be described herein.

As described above, the switching of the current in primary coil 26a on FIG. 1 is performed by the two Darlington transistors 8 and 15. When the primary coil 26a has a positive voltage relative to ground, the current flows through diode 16 and through Darlington transistor 15 while in its conducting state. When the primary coil 26a has a negative voltage relative to ground, the current flows from ground through Darlington transistor 8 while in its conducting state and through diode 9 to the primary coil 26a.

As stated before, both Darlington transistors 8 and 15 are in their conducting state when conductor A is held at ground. For Darlington transistor 15, inverter 10 holds the base of PNP transistor 13 and NPN transistor 12 high by allowing the voltage from conductor Vs to reach their bases through resistor 11. This keeps PNP transistor 13 switched to non-conducting and NPN transistor 12 to conducting. This allows current to flow from conductor Vs into the collector and out the emitter of NPN transistor 12 through resistor 14 to the base of the Darlington transistor 15. This allows the Darlington transistor 15 to conduct the primary coil 26a current through diode 16 when the coil has a positive voltage relative to ground.

While conductor A is held at ground, inverter 1 holds the base of NPN transistor 5 high by allowing the voltage from conductor Vs to reach its base through resistor 2. This connects the base of PNP transistor 6 to ground through resistor 4 putting PNP transistor 6 in its conducting state. As a result, current from Vs flows in the emitter and out the collector of PNP transistor 6 through resistor 7 into the base of the Darlington transistor 8. This allows the Darlington transistor 8 to conduct the primary coil 26a current through diode 9 when primary coil 26a has a negative voltage relative to ground.

To generate a spark, the micro-chip 55 on FIG. 2 places the timing output pin 57 low changing both Darlington transistors 8 and 15 on FIG. 1 to their non-conducting state. The low output from timing output pin 57 on FIG. 2 allows pull-up resistor 60 to hold conductor A high since the output of NAND 58 is high. For Darlington transistor 15 on FIG. 1, inverter 10 sets the bases of both PNP transistor 13 and NPN transistor 12 at ground turning NPN transistor 12 off and placing PNP transistor 13 in its conducting state. As a result, the base of Darlington transistor 15 is connected with ground and disconnected from conductor Vs placing the Darlington transistor 15 in its non-conducting state. The sudden interruption of current flowing through Darlington transistor 15 generates a spark in spark gap 27 when the primary coil 26a has a positive voltage relative to ground.

For Darlington transistor 8, the high input to inverter 1 from conductor A causes its output to be grounded placing the base of NPN transistor 5 at ground and turning NPN transistor 5 off. This interrupts the flow of current through resistor 4 from the base of PNP transistor 6 turning PNP transistor 6 off as well. At this point, resistor 3 ensures that the base of PNP transistor 6 remains at the same voltage as conductor Vs. As a result, current is no longer flowing into the base of Darlington transistor 8 placing it in its non-conducting state. The sudden interruption of current flowing through Darlington transistor 8 generates a spark in spark gap 27 when the primary coil 26a has a negative voltage relative to ground.

The micro-chip 55 on FIG. 2 obtains its timing information from a sensor means, such as the Hall effect IC 54. The Hall effect IC 54 device is activated when it is in close proximity to a magnet. When it is activated, it will conduct the timing input pin 53 to ground. Otherwise, the timing input pin 53 is at the same voltage level as conductor Vr through pull-up resistor 52. The timing input signal, applied to timing input pin 53 and shown on FIG. 4 as curve 66, provides both position and rotation speed of the crank shaft in the internal combustion engine. The timing input signal, shown by curve 66, rises to the voltage Vr at a fixed angle 70 before the engine reaches top dead center for a piston. The period between the voltage rises is used to determine the engine's rotation speed and the time that the voltage rises provides position information. The placement of the magnets and location of the Hall effect IC 54 on FIG. 2 will vary depending on fit, form and function for each engine model.

In order for the micro-chip 55 to perform accurate timing calculations, it requires a reference clock signal on its clock input pin 48. The clock signal is generated by the oscillator IC 47 when it is powered by the positive voltage on conductor Vr. The positive voltage on conductor Vr is provided by the voltage regulator IC 34. Capacitor 35, positioned between the input voltage to the voltage regulator IC 34 and ground, dampens any input voltage fluctuations allowing the voltage regulator IC 34 to provide a constant voltage on conductor Vr. A constant voltage on conductor Vr is critical to the operation of oscillator IC 47 and micro-chip 55.

To prevent any misfires generated by high voltage on conductor Vr or by low voltage on conductor Vs, the invention includes two protection circuits which are shown on FIG. 2. A high voltage protection means for disabling the timing control means prevents a high voltage on conductor Vr by using the silicon controlled rectifier (SCR) 38. When the gate of the SCR 38 is triggered after the voltage in Vr exceeds the break down voltage of the Zener diode 36 and current is directed to its gate by resistor 37, the SCR 38 switches to its conducting state pulling conductor Vr to ground. This will cause the current limit switch 31 to open, since SCR 38 is shorting the circuit. Once current limit switch 31 is open, relay 22 on FIG. 1 will go to its relaxed state. This will return the timing of the spark to alternate switch 23, and the semiconductor switch means will be non-conducting.

For the low voltage condition on conductor Vs, a low voltage protection means for disabling the digital timing control means will operate in the following manner. Zener diode 41 on FIG. 2 will no longer be in its voltage breakdown state. This will allow the base of NPN transistor 43 to return to ground through resistor 42. As a result, the input to inverter 44 will no longer be at ground causing the inverter 44 output to be at ground driving the master clear pin 45 low. The master clear pin 45 is normally pulled high by pull-up resistor 39 when sufficient voltage is available on conductor Vr. When the master clear pin 45 is low, the micro-chip 55 stops all output. The enable pin 56 is open allowing resistor 18 on FIG. 1 to pull the base of NPN transistor 19 to ground turning the NPN transistor 19 off. As a result, relay 22 will no longer be connected to ground causing it to go to its relaxed state. To prevent an over voltage caused by the stored energy in the relay 22 coil, resistor 20 is placed to dissipate the relay 22 coil current after the NPN transistor 19 is turned off. Once relay 22 is relaxed, the timing of the spark will return to alternate switch 23.

To prevent a rouge spark from being generated when switch 32 is opened or when the low voltage protection shuts down the digital control, the NAND 58 on FIG. 2 holds conductor A high until conductor D reaches ground when the relay 22 switches on FIG. 1 have returned to their relaxed position. By holding conductor A high, the Darlington transistors 8 and 15 will remain conducting during the transition from digital controlled switching to the alternate switch 23. After conductor D is connected to ground by the relay 22 switch, the NAND 58 on FIG. 2 will hold conductor A low and place the Darlington transistors 8 and 15 on FIG. 1 in their non-conducting state. In this condition, alternate switch 23 will control the time of the spark.

When the voltage is normal on conductor Vs, the low voltage protection circuit on FIG. 2 holds the master clear pin 45 high allowing the micro-chip 55 to function. The Zener diode 41 is in its voltage breakdown state allowing current to flow through the current limiting resistor 40 and the Zener diode 41 to the base of NPN transistor 43 placing NPN transistor 43 in its conducting state. The input to inverter 44 is low causing the inverter 44 output to be open allowing the pull-up resistor 39 to put the master clear pin 45 to the same voltage level as conductor Vr.

Figure 4:
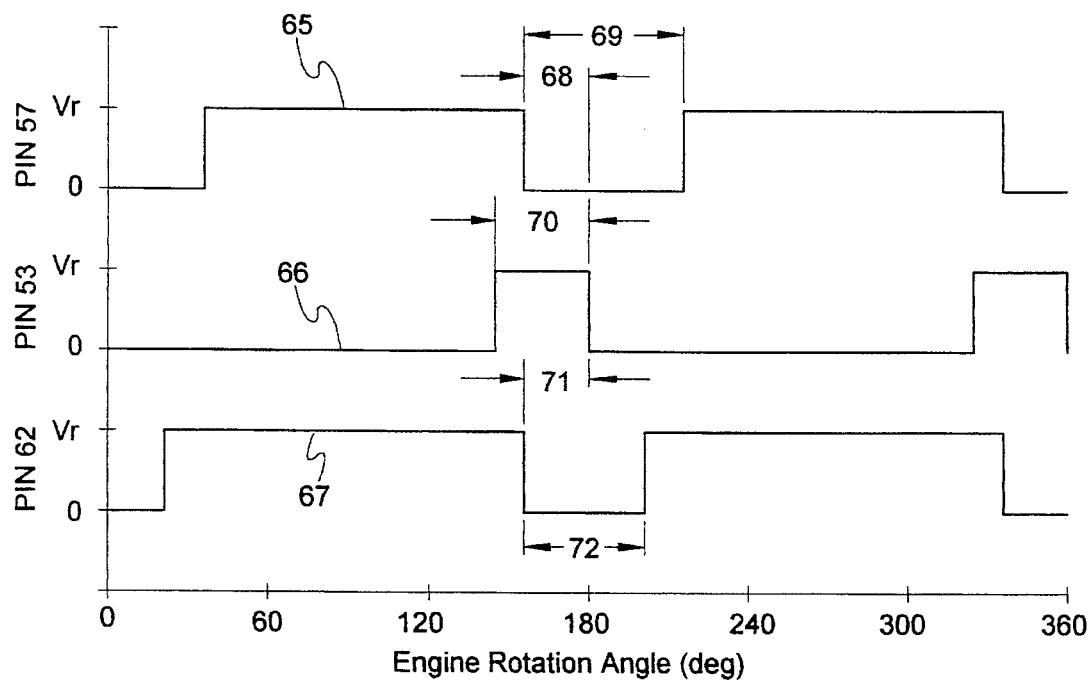
FIG. 4 illustrates signal traces on three pins versus the engine rotation angle.

As an alternate timing signal, alternate switch 23 on FIG. 1 is available on conductor B once relay 22 is excited. Curve 67 on FIG. 4 shows the voltage trace at alternate timing input pin 62 on FIG. 2 when the digital timing control means is operating. When switch 23 is closed, it places the input of inverter 51 on FIG. 2 to ground through resistor 50. The output of inverter 51 is open allowing resistor 49 to pull up the alternate timing input pin 62 to the voltage of conductor Vr. When alternate switch 23 on FIG. 1 is open, it allows resistor 61 on FIG. 2 to pull up the input of inverter 51 to the voltage of conductor Vr. The output of inverter 51 is at ground pulling the alternate timing input pin 62 low to ground. Alternate advance angle 71 on FIG. 4 represents the timing advance angle that the alternate switch 23 on FIG. 1 generates when it controls the spark timing. Fixed dwell angle 72 on FIG. 4 represents the fixed dwell angle of the alternate switch 23 on FIG. 1.

Figure 3:
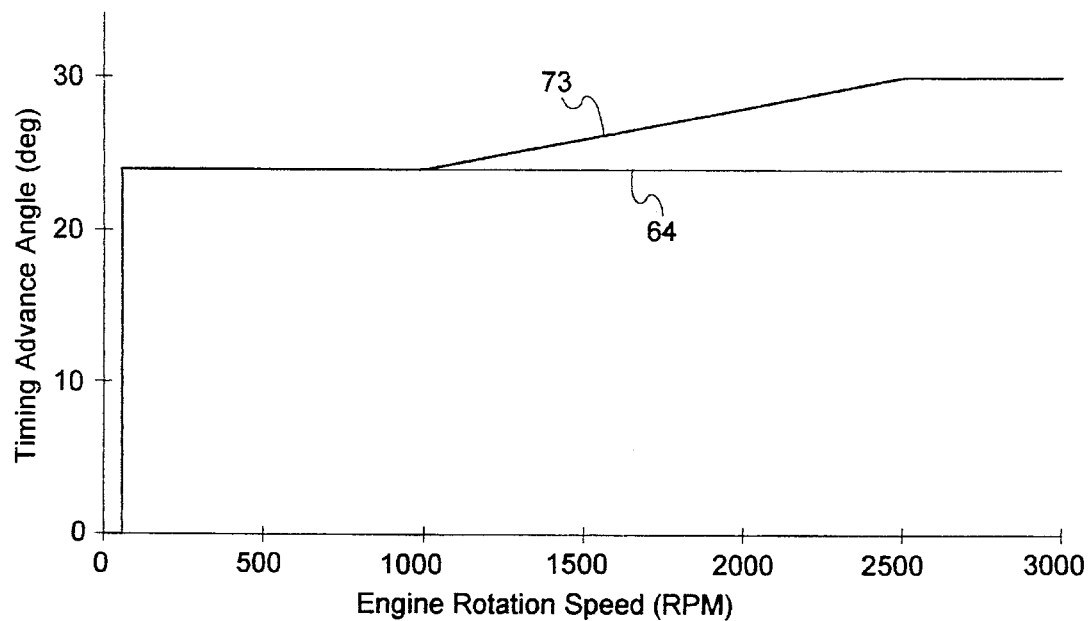
FIG. 3 illustrates a graph of the timing advance angle versus engine rotation speed.
Figure 5:
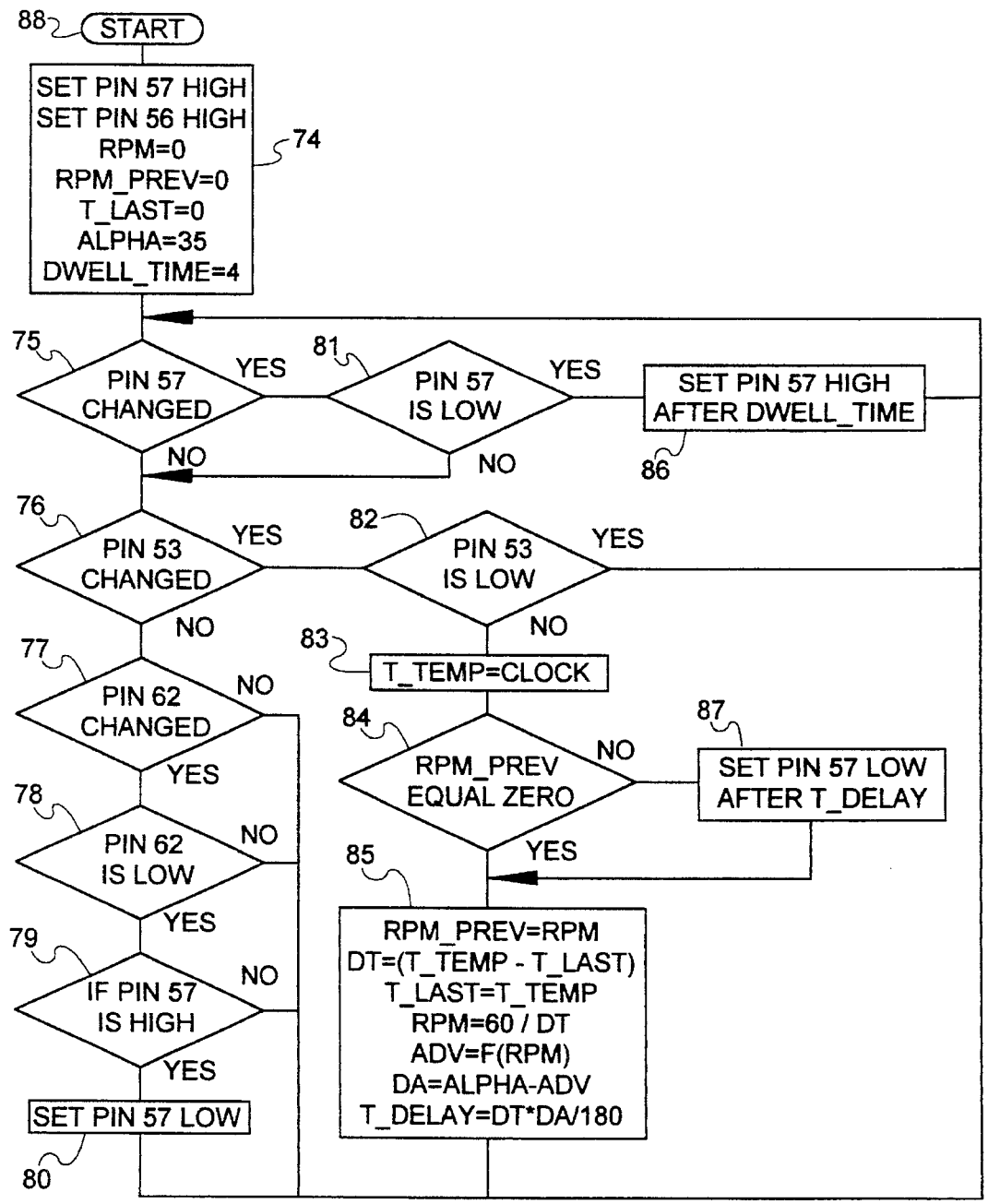
FIG. 5 illustrates the algorithm used by the timing control means.

In order for the timing control means to generate a timing advance angle that follows curve 73 on FIG. 3 as the engine varies it rotational speed, the digital timing control means, micro-chip 55 on FIG. 2, uses the algorithm shown on FIG. 5. As described earlier when micro-chip 55 on FIG. 2 receives power from conductor Vr and the master clear pin 45 is high, micro-chip 55 begins executing the algorithm at the start 88 on FIG. 5. As describe above, the initialization block 74 first sets both timing output pin 57 and enable pin 56 high preparing both the semiconductor switch means and the alternate switch means for digital control. The initialization block 74 continues by setting critical registers to prescribed values. The ALPHA register is set to a value of 35 degrees which is equal to the fixed angle 70 shown on FIG. 4. The DWELL_TIME register is set to 4 ms. DWELL_TIME is equal to the period that the Darlington transistors 8 and 15 on FIG. 1 will be switched off when a spark is generated in spark gap 27.

After the initialization block 74 on FIG. 5 is executed, the algorithm proceeds to continuously loop through the remaining instructions until the micro-chip 55 on FIG. 2 stops by loosing power or by the master clear pin 45 dropping to ground. The first instruction after the initialization block 74 on FIG. 5 is conditional 75. Conditional 75 checks to see if the micro-chip 55 on FIG. 2 has changed its timing output pin 57. If the answer is yes, then conditional 81 on FIG. 5 checks to see if timing output pin 57 is low. If the answer to conditional 81 is yes, then block 86 ensures that the timing output pin 57 will remain low for a fixed time equal to DWELL_TIME or the dwell period. The dwell period times the rotation speed convened to degrees will yield the dwell angle 69 shown on FIG. 4. Dwell angle 69 will vary with respect to engine speed, but the dwell period will be fixed. After block 86 on FIG. 5 is completed control returns to conditional 75. If timing output pin 57 has changed and timing output pin 57 is low in conditional 81, the algorithm continues with conditional 76. If timing output pin 57 has not changed before conditional 81, the algorithm continues with conditional 76.

At conditional 76, the timing input pin 53 is checked to see if it has changed. A trace of the input signal is shown by curve 66 on FIG. 4. If timing input pin 53 has changed, then conditional 82 is next. Conditional 82 checks to see if timing input pin 53 is low. If timing input pin 53 is low, then control is returned to conditional 75. If timing input pin 53 is high, then block 83 is next. Block 83 reads the CLOCK and sets register T_TEMP to equal the CLOCK value. Conditional 84 checks to see if RPM_PREV is equal to zero. If not, block 87 will set the timing output pin 57 to low after delaying for a period equal to T_DELAY. At the moment timing output pin 57 switches to low, a spark is generated in spark gap 27 on FIG. 1.

After conditional 84 or block 87 on FIG. 5, block 85 proceeds to compute all the necessary timing parameters. First, RPM_PREV register is set equal to the RPM register. DT, which is the period between this time that timing input pin 53 changed to high and the last time, is computed by subtracting register T_TEMP from T_LAST. T_LAST is set equal to T_TEMP. The engine speed is computed by dividing a constant by DT, and the result is placed in register RPM. The ADV register is set to the timing advance angle as a function of the computed value in register RPM. The set of timing advance angles used is shown by curve 73 on FIG. 3. A delay angle is computed by subtracting ADV from ALPHA, and the result is placed in register DA. The delay angle is equal to an angle formed by subtracting advance angle 68 from fixed angle 70 on FIG. 4. The delay angle is convened to a delay period by multiplying DA by DT and dividing by 180 degrees, and the result is placed in register T_DELAY. At this point block 85 on FIG. 5 is completed and control returns to conditional 75.

If timing output pin 57 has not changed by conditional 75 and if timing output pin 53 has not changed by conditional 76, then conditional 77 is reached. At this point, alternate timing input pin 62 is checked for a change in value. The signal input to alternate timing input pin 62 is shown by curve 67 on FIG. 4. If alternate timing input pin 62 has not changed, control is returned to conditional 75 on FIG. 5. Otherwise, alternate timing input pin 62 is checked to see if it is low in conditional 78. If it is not low, control is returned to conditional 75. Otherwise, timing output pin 57 is checked to see if it is high in conditional 79. If it is not high, control is return to conditional 75. Otherwise, block 80 sets the timing output pin 57 low causing a spark to be generated in spark gap 27 on FIG. 1.

The preceding paragraphs have described the functions of all the components that are illustrated in both FIG. 1 and FIG. 2, and they describe the operation of the algorithm shown in FIG. 5. Together they comprise the preferred embodiment of this invention. The invention provides for the precise control of the timing advance angle by using the timing control means to compute the optimum timing advance angle based on the input signals it receives. By adjusting the timing advance angle, the invention improves the efficiency of the combustion cycle of the internal combustion engine. Increasing the engine's efficiency has the advantage of both reducing its toxic exhaust emissions and reducing its specific fuel consumption rate.

The alternate timing means of the invention provides the advantage of increased operational reliability by allowing the internal combustion engine to continue to generate full power even if the electrical system, which provides power to the timing control means, fails. The invention has the advantage of reducing errors generated by a digital system when the voltage supplied is too high or too low. Reducing digital errors helps to prevent the engine from experiencing a loss of power or premature detonation.

The invention also has a distinct advantage of switching both the positive and negative waves of current generated by the magneto in primary coil 26a. This allows the semiconductor switch to generate a spark on either polarity of current. By switching both waves for existing magnetos, the internal combustion engine will have the proper number of sparks generated per rotation with the advantage of modern timing control.

The invention has a distinct ability of being easily retrofited to existing magneto systems. An existing magneto consists of the components shown on FIG. 1 which are cam 24, switch 23, magnet 25, primary coil 26a, secondary coil 26b, core 26c, spark gap 27, ground switch 28 and capacitor 29. The invention is installed by placing relay 22 into the primary circuit and by connecting the two Darlington transistor pairs, Darlington transistor 15 and 8, to the same primary circuit. This feature allows breaker type magnetos to be upgraded to a modem method of timing control while retaining its operational reliability. Using this modem method of timing control will result in increased efficiency of existing internal combustion engines.

The preferred embodiment of the invention is presented here for illustration purposes. Clearly, the invention may be embodied in another form; therefore, the invention may be identified by the following claims.

I claim:

1. An ignition system for an internal combustion engine having a magneto generator comprising a rotor having a magnet, said rotor rotationally coupled to said internal combustion engine;

a primary and a secondary induction coil magnetically coupled to said magneto generator and at least one spark gap connected to said secondary induction coil;

sensor means for providing a timing signal representing a rotational position;

timing control means connected to said sensor means for generating a switching time signal in response to said timing signal, said timing control means together including means for generating an enable signal;

semiconductor switch means controlled by said switching time signal and connected to said primary induction coil, forming a primary circuit for conducting and interrupting current flowing in said primary induction coil in response to said switching time signal thereby generating a spark in said spark gap;

alternate timing means coupled to the rotation of said rotor, said alternate timing means being activated in an absence of said enable signal, and connected to said primary induction coil forming an alternate primary circuit for generating said spark in said spark gap.

2. An ignition system according to claim 1, further comprising said timing control means including means timer computing a speed of said internal combustion engine;

said timing control means including means for finding a timing advance angle as a function of said speed;

said timing control means including means for adjusting said switching time signal in response to said timing advance angle thereby generating said spark in said spark gap at said timing advance angle.

3. An ignition system according to claim 2, further comprising voltage protection means for disabling said timing control means after detecting an operating voltage of said timing control means which is either below a minimum value or above a maximum value resulting in said absence of said enable signal thereby said alternate timing means is enabled.

4. An ignition system according to claim 1, further comprising voltage protection means for disabling said timing control means after detecting an operating voltage of said timing control means which is either below a minimum value or above a maximum value resulting in said absence of said enable signal thereby said alternate timing means is enabled.

5. An ignition system for an internal combustion engine having a magneto generator comprising a rotor having a magnet, said rotor rotationally coupled to said internal combustion engine;

a primary and a secondary induction coil magnetically coupled to said magneto generator and at least one spark gap connected to said secondary induction coil;

timing control means for generating a switching time signal;

semiconductor switch means controlled by said switching time signal and connected to said primary induction coil, forming a primary circuit for conducting and interrupting a current flowing in first and second direction of said primary induction coil thereby generating a spark in said spark gap.

6. An ignition system according to claim 5, further comprising sensor means for providing a timing signal representing a rotational position;

said timing control means connected to said sensor means including means for adjusting said switching time signal based on said timing signal.

7. An ignition system according to claim 6, further comprising said timing control means including means for computing a speed of said internal combustion engine;

said timing control means including means for finding a timing advance angle as a function of said speed;

said timing control means including means for adjusting said switching time signal in response to said timing advance angle thereby generating said spark in said spark gap at said timing advance angle.

8. An ignition system according to claim 7, further comprising said timing control means including means for generating an enable signal;

alternate timing means coupled to the rotation of said rotor, said alternate timing means being activated in an absence of said enable signal, and connected to said primary induction coil forming an alternate primary circuit for generating said spark in said spark gap.

9. An ignition system according to claim 8, further comprising voltage protection means for disabling said timing control means after detecting an operating voltage of said timing control means which is either below a minimum value or above a maximum value resulting in said absence of said enable signal thereby said alternate timing means is enabled.

10. An ignition system according to claim 6, further comprising said timing control means including means for generating an enable signal;

alternate timing means coupled to the rotation of said rotor, said alternate timing means being activated in an absence of said enable signal, and connected to said primary induction coil forming an alternate primary circuit for generating said spark in said spark gap.

11. An ignition system according to claim 10, further comprising voltage protection means for disabling said timing control means after detecting an operating voltage of said timing control means which is either below a minimum value or above a maximum value resulting in said absence of said enable signal thereby said alternate timing means is enabled.

12. An ignition system according to claim 5, further comprising said timing control means including means for generating an enable signal;

alternate timing means coupled to the rotation of said rotor, said alternate timing means being activated in an absence of said enable signal, and connected to said primary induction coil forming an alternate primary circuit for generating said spark in said spark gap.

13. An ignition system according to claim 12, further comprising voltage protection means for disabling said timing control means after detecting an operating voltage of said timing control means which is either below a minimum value or above a maximum value resulting in said absence of said enable signal thereby said alternate timing means is enabled.

14. An ignition system for an internal combustion engine having a magneto generator comprising a rotor having a magnet, said rotor rotationally coupled to said internal combustion engine;

a primary and a secondary induction coil magnetically coupled to said magneto generator and at least one spark gap connected to said secondary induction coil;

sensor means for providing a timing signal representing a rotational position;

an oscillator providing a clock signal;

timing control means connected to said sensor means and connected to said oscillator for generating a switching time signal;

a first diode connected to said primary induction coil biased to conduct a current flowing from said primary induction coil;

a first semiconductor switching device in series with said first diode and said induction coil, forming a first primary circuit for said current flowing from said primary induction coil;

means for enabling said first semiconductor device in response to said switching time signal;

a second diode connected to said primary induction coil biased to conduct said current flowing to said primary induction coil;

a second semiconductor switching device in series with said second diode and said induction coil, forming a second primary circuit for said current flowing to said primary coil;

means for enabling said second semiconductor switching device in response to said switching time signal.

15. An ignition system according to claim 14, further comprising said timing control means including means for computing a speed of said internal combustion engine;

said timing control means including means for finding a timing advance angle as a function of said speed;

said timing control means including means for adjusting said switching time signal in response to said timing advance angle thereby generating said spark in said spark gap at said timing advance angle.

16. An ignition system according to claim 15, further comprising said timing control means including means for generating an enable signal;

alternate timing means coupled to the rotation of said rotor, said alternate timing means being activated in an absence of said enable signal, and connected to said primary induction coil forming an alternate primary circuit for generating said spark in said spark gap.

17. An ignition system according to claim 16, further comprising voltage protection means for disabling said timing control means after detecting an operating voltage of said timing control means which is either below a minimum value or above a maximum value resulting in said absence of said enable signal thereby said alternate timing means is enabled.

18. An ignition system according to claim 14, further comprising said timing control means including means for generating an enable signal;

alternate timing means coupled to the rotation of said rotor, said alternate timing means being activated in an absence of said enable signal, and connected to said primary induction coil forming an alternate primary circuit for generating said spark in said spark gap.

19. An ignition system according to claim 18, further comprising voltage protection means for disabling said timing control means after detecting an operating voltage of said timing control means which is either below a minimum value or above a maximum value resulting in said absence of said enable signal thereby said alternate timing means is enabled.

* * * * *